United States Patent [19]

Patil

[11] 3,974,822

[45] Aug. 17, 1976

[54] SOLAR HEAT COLLECTOR
[75] Inventor: Pandit G. Patil, Pittsburgh, Pa.
[73] Assignee: PPG Industries, Inc., Pittsburgh, Pa.
[22] Filed: Mar. 13, 1974
[21] Appl. No.: 450,703

[52] U.S. Cl. ............................... 126/271; 52/172
[51] Int. Cl.² ......................................... F24J 3/02
[58] Field of Search ............... 126/270, 271; 52/172

[56] References Cited
UNITED STATES PATENTS

| | | | |
|---|---|---|---|
| 2,566,327 | 9/1951 | Hallock | 126/270 X |
| 2,684,266 | 7/1954 | Englehart | 52/172 |
| 2,705,948 | 4/1955 | Rostock | 126/271 |
| 2,902,028 | 9/1959 | Manly | 126/271 |
| 3,039,453 | 6/1962 | Andrassy | 126/271 |
| 3,107,052 | 10/1963 | Garrison | 126/271 X |
| 3,176,678 | 4/1965 | Langley | 126/270 |
| 3,453,666 | 7/1969 | Hedges | 126/271 |
| 3,758,996 | 9/1973 | Bowser | 52/172 |

FOREIGN PATENTS OR APPLICATIONS

| | | | |
|---|---|---|---|
| 938,012 | 9/1963 | United Kingdom | 126/271 |
| 282,819 | 10/1971 | U.S.S.R. | 126/271 |

OTHER PUBLICATIONS

*Physka Status, Solidi,* vol. 14, 1966, pp. 69–75.

Tabor, H., "Selective Radiation", Bull. Res. counc. of Israel, vol. 5A, 1956 pp. 119–128.

*Primary Examiner*—Kenneth W. Sprague
*Assistant Examiner*—James C. Yeung
*Attorney, Agent, or Firm*—Donald Carl Lepiane

[57] ABSTRACT

A solar heat collector is disclosed having an outer cover plate, an intermediate cover plate and a solar radiation absorber mounted in spaced relation to each other by edge packing. The edge packing (1) removes moisture from the air space between the cover plates and absorber and (2) prevents moisture from entering the air space between the cover plates and the absorber.

9 Claims, 10 Drawing Figures

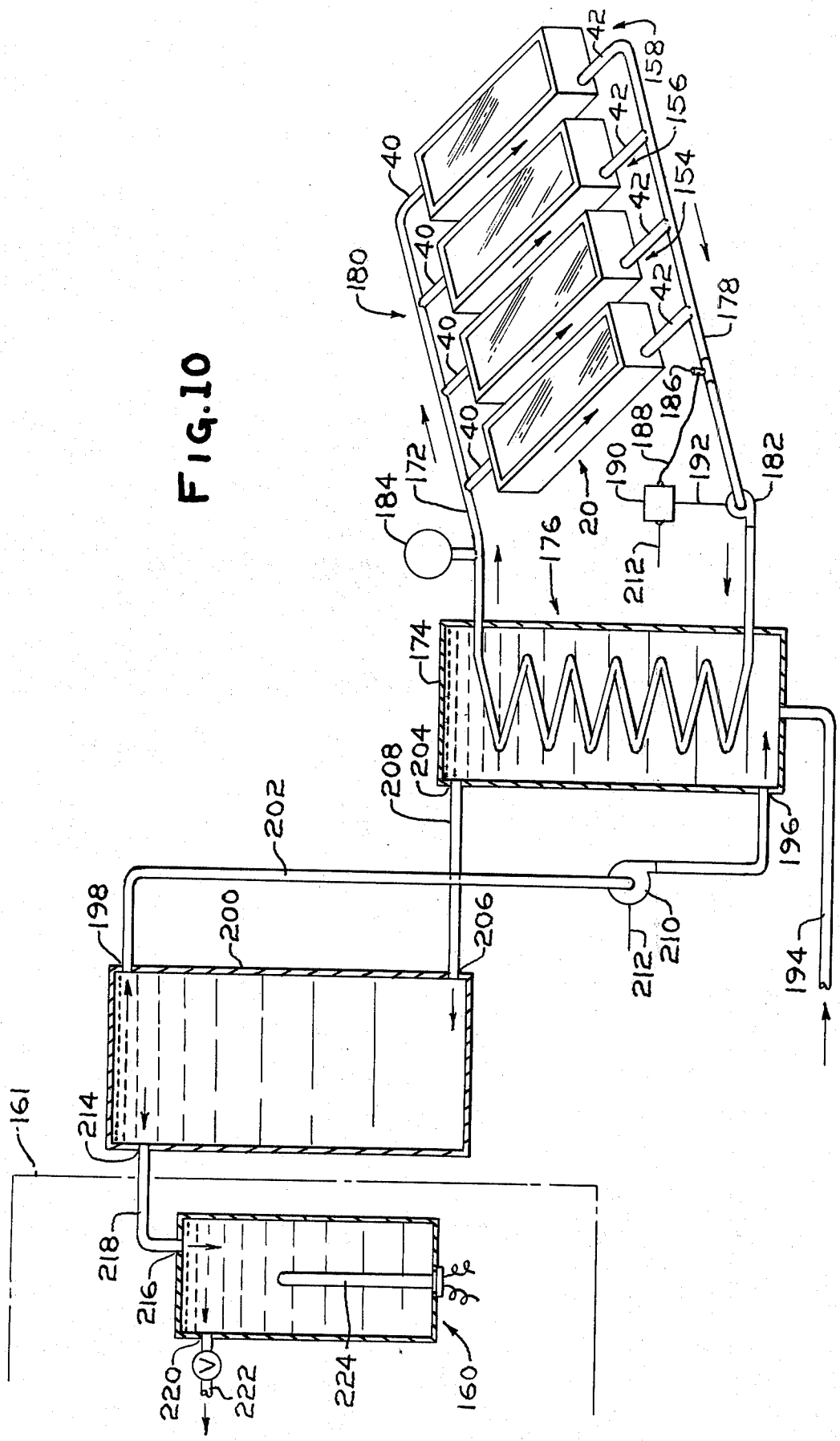

SOLAR HEAT COLLECTOR

Cross Reference to Related Applications

The teachings of U.S. patent application Ser. No. 450,702 filed even date, in the name of Frank H. Gillery and entitled "Solar Heat Collector" are hereby incorporated by reference.

BACKGROUND OF THE INVENTION

1. Field of the Invention

This invention relates to a solar heat collector.

2. Description of the Prior Art

The advantages of using solar heat collectors to collect solar energy for heating a fluid and/or for generating electric power have been recognized in the prior art. For example, advantages and embodiments of the prior art solar heat collectors are discussed in (1) an article entitled "Solar Energy Researchers Try a New Way", *Business Week*, June 12, 1971, page 72; (2) an article entitled "Solar Energy: A Feasible Source of Power", *Science*, Vol. 172, page 660; and (3) U.S. Pat. No. 2,888,007.

In general, prior art solar heat collectors include an absorber for absorbing solar radiation and infrared energy and a transparent cover plate in spaced relation to the absorber for trapping infrared energy between the absorber and the cover plate.

Although there are many solar heat collector designs in the prior art, each of the designs have drawbacks. For example, during the day, solar energy rays are incident on the absorber of the solar heat collector. The heat absorber the solar energy and is heated. Particularly in the evening, the temperature of the solar heat collector decreases. Any moisture trapped in the space between the cover plate and absorber during fabrication and/or moisture that moves into the space during use of the collector condenses on the surface of the cover plate and the absorber. The moisture acts as a barrier to the solar radiation decreasing the absorptivity coefficient of the absorber and the transmittance coefficient of the cover plate, thereby requiring a longer time for the heat collector to be heated by solar radiation. As the solar heat collector is heated by solar radiation and infrared energy, the moisture evaporates and in some instances, leaves spots on the cover plate and/or absorber. These spots further reduce the efficiency of the solar heat collector by decreasing the transmittance coefficient of the cover plate and the absorptivity coefficient of the absorber.

Another drawback of the prior art solar heat collectors is that they are expensive to construct because they are not readily adapted for construction on a mass production basis.

It would be advantageous, therefore, if a solar heat collector were available that eliminated the drawbacks of the prior art.

SUMMARY OF THE INVENTION

This invention relates to an improved heat collector of the type having at least one cover plate for transmitting solar radiation mounted in spaced relation to means for absorbing solar radiation and infrared radiation. The improvement includes facilities for absorbing moisture, e.g., a spacer dehydrator element or silica gel mounted in a hollow rigid spacer, from between the at least one cover plate and the absorber and for preventing movement of moisture between the at least one cover plate and the absorber, e.g., providing moisture-impervious adhesive between opposed surfaces of the spacer and adjacent surfaces of the cover plate and absorber. Normally, the collector of this invention is mounted in an insulating box to reduce convection and conduction heat losses.

The improved solar heat collector obviates the limitations of the prior art heat collectors. More particularly, by keeping the space between the plate and absorber moisture-free, no condensation will form on the plate and/or absorber when the collector cools.

BRIEF DESCRIPTION OF THE DRAWINGS

FIG. 10 is a view of a solar heating system using solar heat collectors constructed in accordance to the teachings of the invention to heat water.

DESCRIPTION OF THE INVENTION

Figure 1:
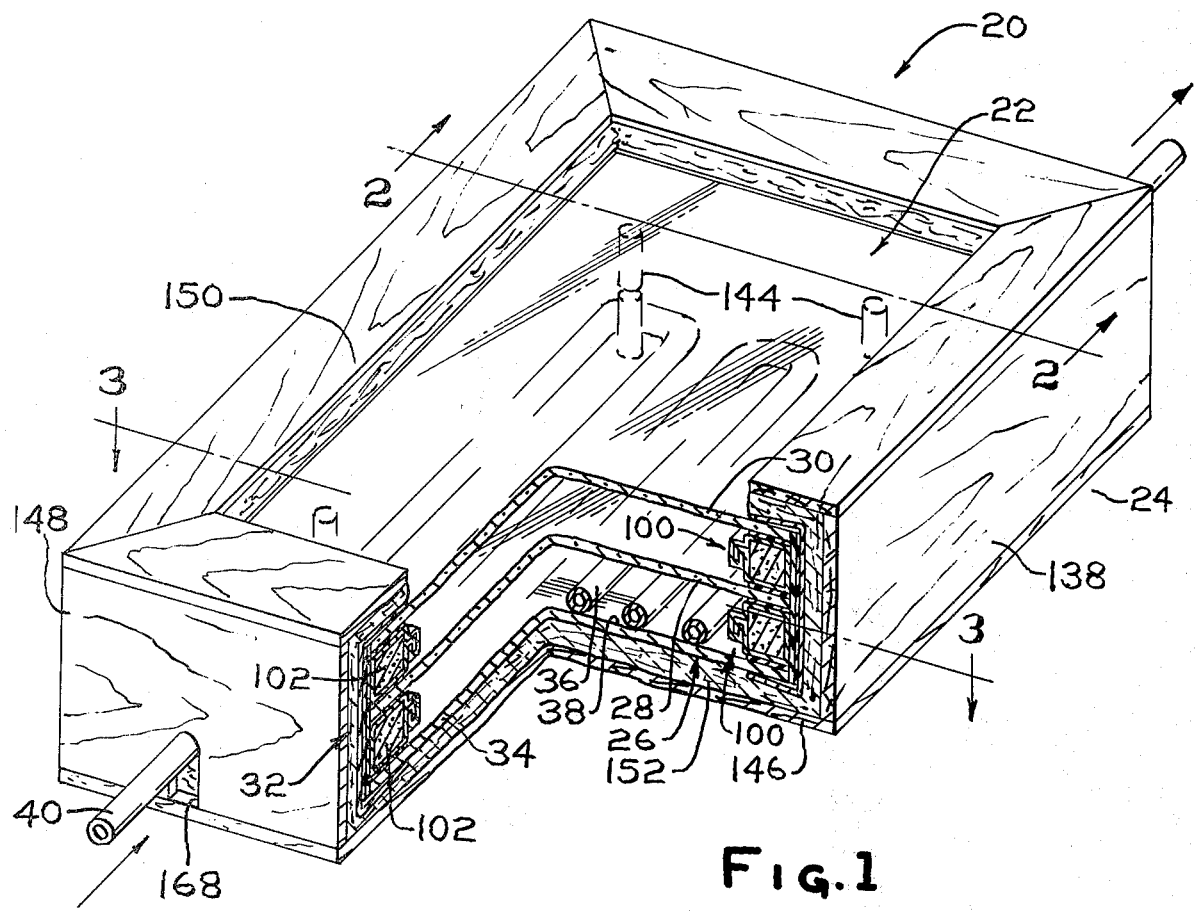
FIG. 1 is an isometric view of a solar heat collector unit constructed in accordance to the teachings of the invention and having portions removed for purposes of clarity.

With reference to FIG. 1, solar heat collector unit 20 of this invention, in general, includes a solar heat collector 22 mounted in an insulated box 24. The solar heat collector 22 includes a solar radiation and infrared energy absorber 26, intermediate and outer cover plates 28 and 30 respectively, mounted in spaced relation to the absorber 26. The cover plates 28 and 30 (1) pass solar radiation to the absorber, (2) reflect infrared energy back toward the absorber, (3) trap infrared energy between the cover plate and absorber, and (4) reduce convection heat losses. The absorber and cover plates 26, 28 and 30, respectively, are held in spaced relation by edge packing 32, which edge packing (1) absorbs moisture trapped between the cover plates and the absorber during fabrication of the collector 22, and (2) prevents moisture from moving into the space between the cover plates and the absorber during use of the heat collector unit 20. The heat collector 22 is preferably mounted in the insulated box 24 to minimize conduction and convection heat losses.

Figure 2:
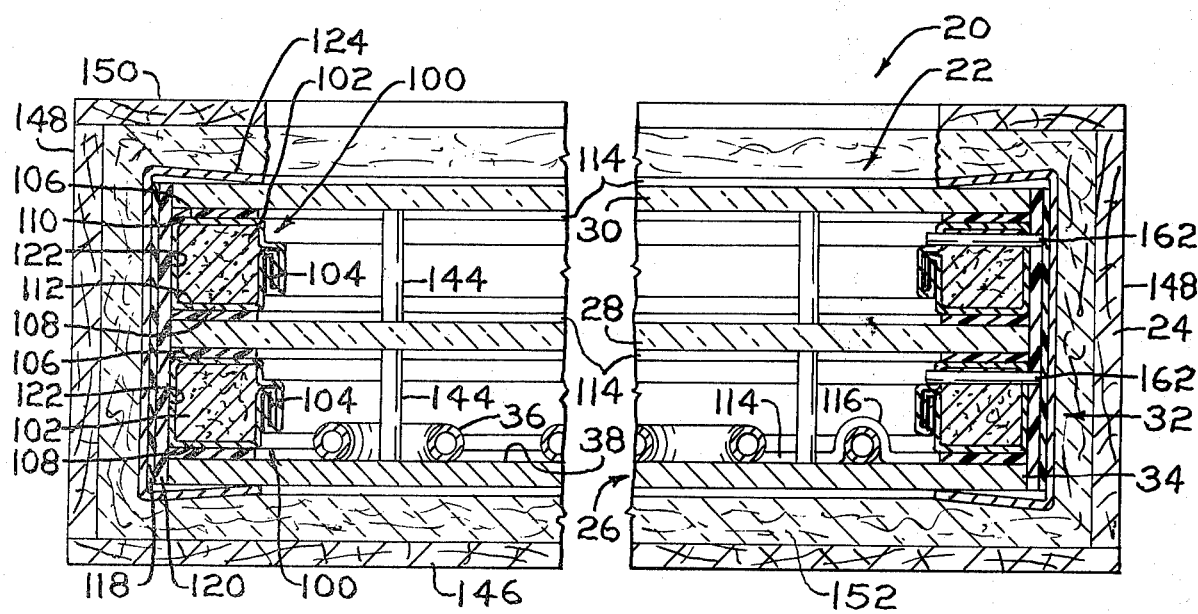
FIG. 2 is a cross-sectional view of the solar heat collector unit taken along lines 2—2 of FIG. 1.

With reference to FIGS. 1 and 2, the absorber 26 includes a plate 34 having a conduit 36 mounted on surface 38 of the plate 34. The plate 34 and conduit 36 are made of a heat conductive material such as aluminum, steel or copper. The conduit 36 is advantageously mounted on surface 38 of the plate 34 such that ends 40 and 42 of the conduit 36 extend beyond the insulated box 24 to provide external access to the conduit for moving a heat absorbing medium through the conduit (shown better in FIG. 3). The heat absorbing medium, e.g., water or ethylene glycol mixed with water, is moved through the end 40 of the conduit 36 and out of end 42 of the conduit 36 in any conventional manner. As the absorber 26 is heated by solar radiation and infrared energy, the heat absorbing medium moving through the conduit is heated by conduction and convection.

The surface of the plate 34 and of the conduit 36 preferably absorbs solar energy in the wavelength range of 0.3 to 2.1 microns, and absorbs infrared energy in the wavelength range of 2 to 15 microns.

The amount of solar radiation and infrared energy absorbed and reflected by the absorber 26 is a function of the absorptivity coefficient and emissivity coefficient, respectively, of the absorber surface. As can be appreciated, the absorber surface and conduit surface may be a selective surface or a non-selective surface. A "selective surface", as the term is used herein, is a surface that has an absorption coefficient for solar radiation that is different from its emissivity coefficient for infrared energy. An example of a selective surface is a copper oxide surface which has an absorptivity coefficient of 0.95 for solar energy and an emissivity coefficient of 0.41 for infrared energy. A "non-selective surface", as the term is used herein, is a surface that has an absorptivity coefficient for solar energy that is equal to the emissivity coefficient for infrared energy. An example of a non-selective surface is a black surface which has an absorptivity coefficient of 0.95 for solar energy and an emissivity coefficient of 0.95 for infrared energy.

Figure 3:
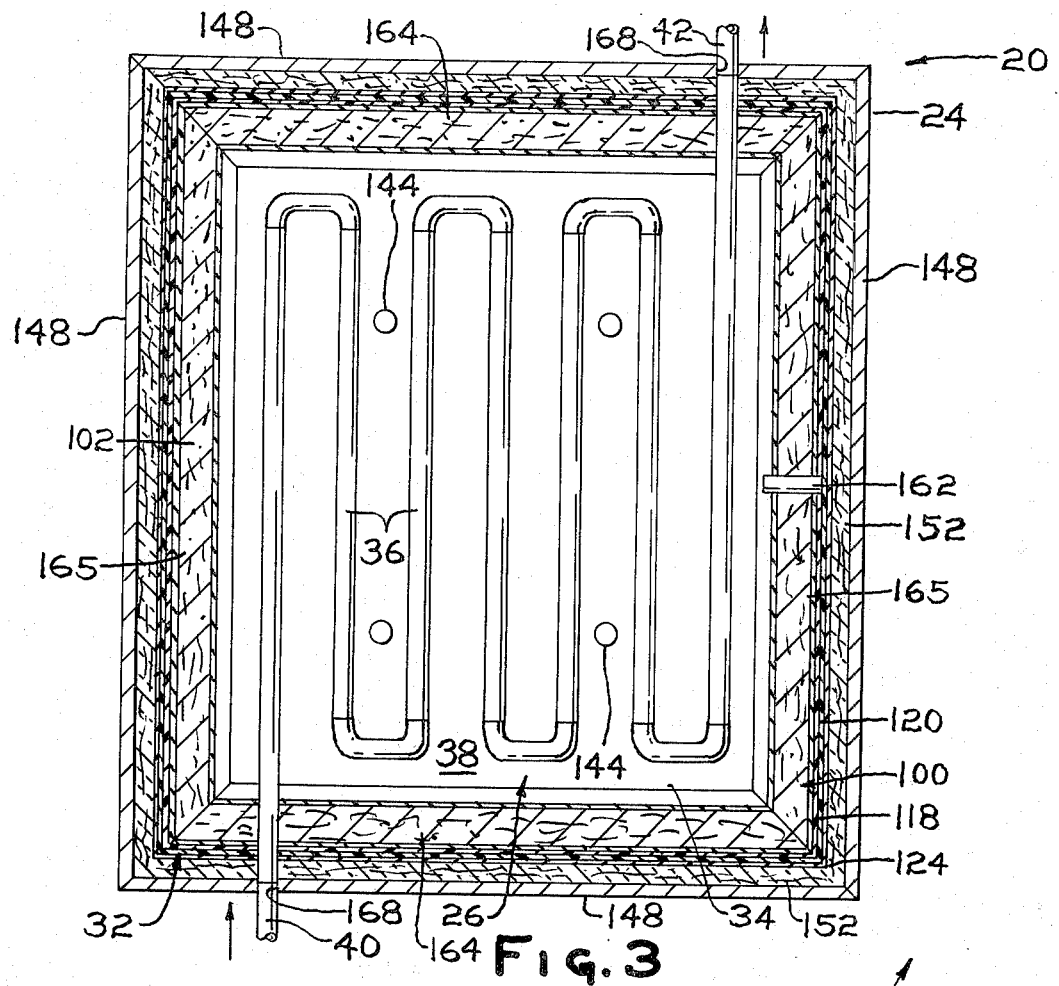
FIG. 3 is a cross-sectional view of the solar heat collector unit taken along lines 3—3 of FIG. 1.
Figure 4:
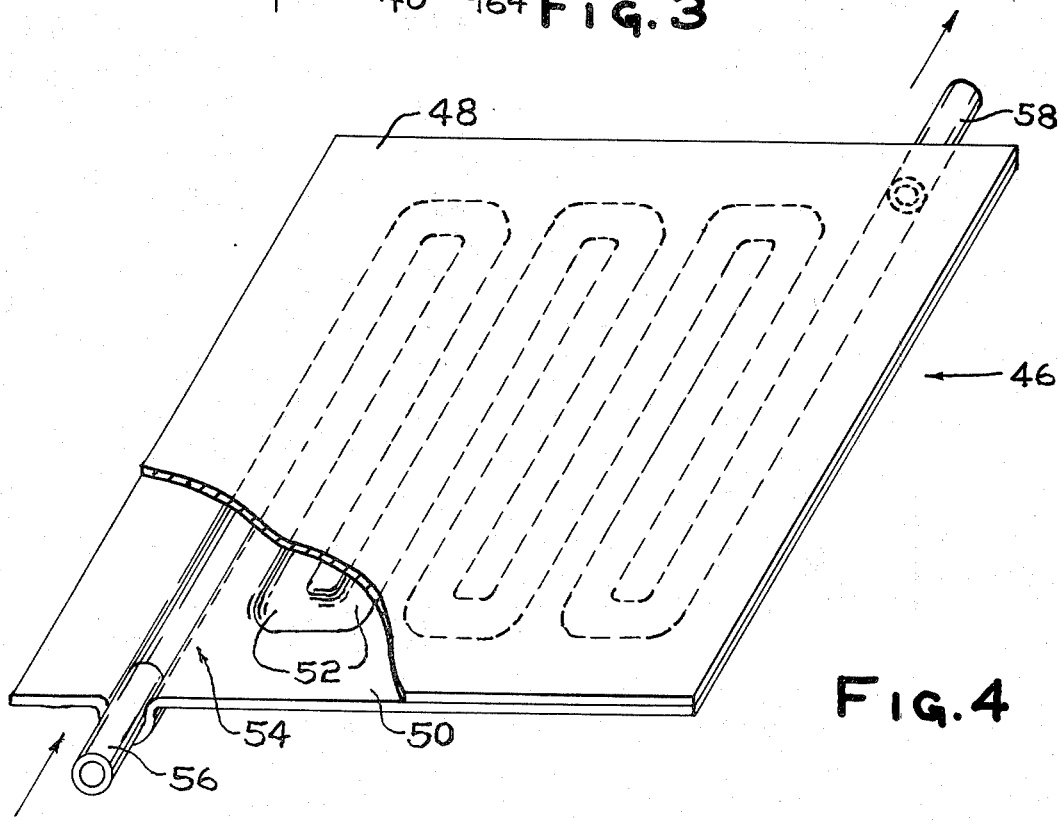
FIG. 4 is an isometric view of a solar radiation and infrared energy absorber that may be used in the practice of the invention and having portions removed for purposes of clarity.

With reference to FIGS. 2 and 3, the conduit 36 is shown mounted on the surface 38 of the plate 34 in the path of solar radiation and infrared energy. As can be appreciated, the invention is not limited thereto. With reference to FIG. 4, there is shown an alternate embodiment of an absorber 46 that may be used in the practice of the invention. The absorber 46 includes a first plate 48 advantageously bonded to a second plate 50 having a series of connected grooves 52 to form a conduit 54 a generally serpentine shape. Pipes 56 and 58 are advantageously mounted at each end of the conduit to provide access to the conduit for moving a heat-absorbing medium through the conduit.

With reference to FIGS. 3 and 4, the conduits 36 and 54 may be arranged in the path of the solar radiation or in the alternative facing away from the solar radiation. In this regard, it has been found that when the conduits 36 and 54 face the sun, the amount of time required to heat the heat-absorbing medium decreases. It is believed that this is due to the fact that the solar radiation and infrared energy are directly incident on the conduit. In those instances where the conduit is facing away from the sun, only the plate is directly heated by solar radiation and infrared energy. The conduit and the heat-absorbing medium is heated by heat transmitted by conduction through the plate to the conduit. Therefore, the time required to heat the medium increases. Further, by mounting the conduits facing the sun, heat conduction losses of the medium are reduced thereby maintaining the medium at a higher temperature. On the other hand, when the conduit is facing away from the sun, the solar heat collector is aesthetically pleasing.

In general, the amount of time required to heat the heat-absorbing medium in the conduit to a predetermined temperature for a given solar heat absorber located at a given geographic location depends on (1) the length of the conduit; (2) the inside diameter (I.D.) of the conduit; (3) the heat-absorbing quality of the medium moving through the conduit; and (4) the flow rate of the medium moving through the conduit. For example, as the length of the conduit increases, the remaining parameters kept constant, the time required to heat the medium to the predetermined temperature decreases. As the inside diameter of the conduit decreases, the remaining parameters kept constant, the amount of time required to heat the medium to the predetermined temperature decreases. As the heat-absorbing quality of the medium decreases, the remaining parameters kept constant, the amount of time required to heat the medium to the predetermined temperature increases. As the flow of the medium increases, the remaining parameters kept constant, the amount of time required to heat the medium to the predetermined temperature increases.

With reference to FIGS. 1 and 2, the intermediate cover plate 28 and outer plate 30 are mounted in spaced relation to each other and the absorber 26 in a manner to be discussed below.

The cover plates 28 and 30 are selected to pass solar radiation and to reflect and/or trap infrared energy. The cover plates 28 and 30 may be made of commercial-soda-lime glass or borosilicate glass. To improve the reflectance coefficient of the plates while passing sufficient solar energy to the absorber, the cover plate 28 and/or cover plate 30 may be coated.

By selecting (1) the absorptivity coefficient and emissivity coefficient of the absorber 26 and (2) the transmittance coefficient and reflectance coefficient of the cover plates 28 and 30, the efficiency of the solar heat collector 22 can be improved.

A discussion of improvements of a solar heat collector by using certain selected cover plates and absorbers is fully discussed in U.S. patent application Ser. No. 450702 filed even date in the name of Frank H. Gillery and entitled "Solar Heat Collector" which teachings are hereby incorporated by reference.

As can be appreciated, the invention is not limited to the type of cover plate, the configuration of the cover plates or the number of cover plates used. For example, in FIG. 2, the intermediate cover plate 28 and the outer cover plate 30 may be made of ⅛ to ¼ inch commercial-soda-lime glass which has a transmittance coefficient of about 0.84 to 0.77 for solar radiation in the wavelength of 0.3 to 2.1 microns and a reflectance coefficient of 0.04 for infrared energy in the wavelength of 2 to 15 microns.

Figure 5:
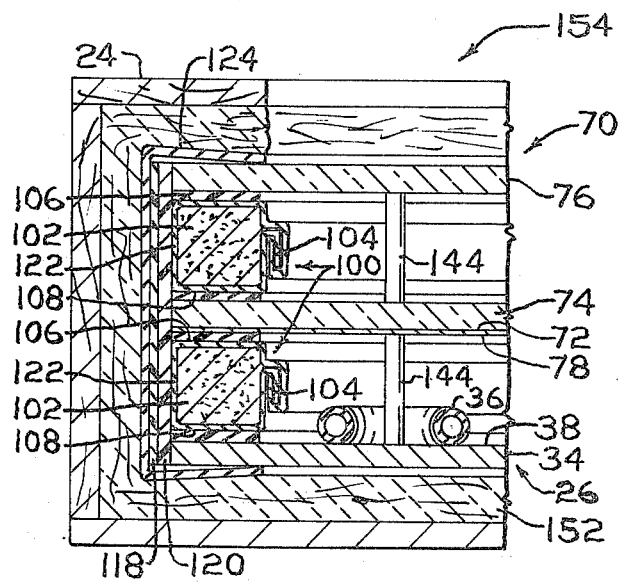
FIGS. 5, 6 and 7 are fragmented cross-sectional views of alternate embodiments of a solar heat collector constructed in accordance to the teachings of the invention.

With reference to FIG. 5, there is shown a solar heat collector 70 similar to the solar heat collector 22 of FIG. 2 with the differences now to be discussed. With reference to FIG. 5, surface 72 of intermediate cover plate 74 may be coated and surfaces of outer cover plate 76 uncoated. For example, the outer cover plate 76 may be commercial-soda-lime glass and the intermediate cover plate 74 may be commercial-soda-lime glass having coating 78 of tin oxide or indium oxide applied to the surface 72.

Figure 6:
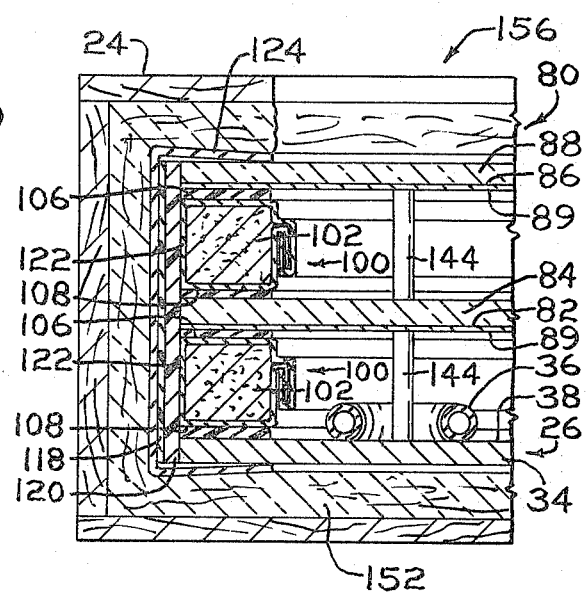

With reference to FIG. 6, there is shown a solar heat collector 80 similar to the solar heat collector 22 of FIG. 2 with the difference now to be discussed. Surface 82 of intermediate cover plate 84 and surface 86 of outer cover plate 88 may each have a coating 89 thereon. For example, the intermediate cover plate 84 and the outer cover plate 88 may be prepared in a similar manner as intermediate cover plate 74 of the solar heat collector 70 of FIG. 5 was prepared.

Figure 7:
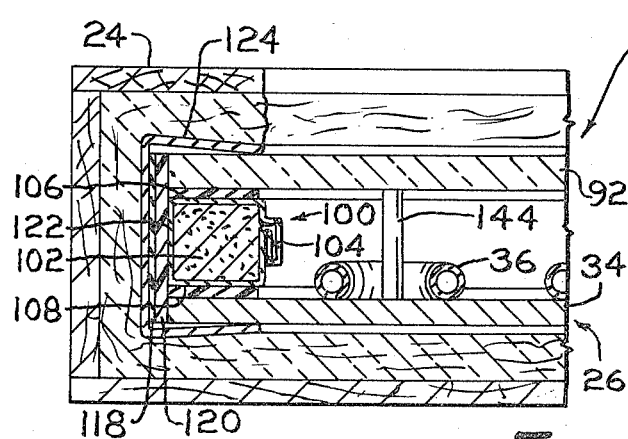
Figure 7:
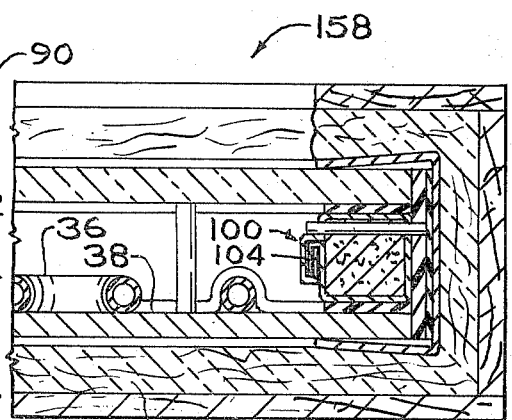

Although the discussion has been directed to solar heat collector having an intermediate and outer cover plates spaced from each other and from an absorber, it can be appreciated that the invention is not limited to the number of plates. More particularly, with reference to FIG. 7, there is shown a solar heat collector 90 similar in construction to the solar heat collector 22 of FIG. 2 with the differences to be discussed. The solar heat collector 90 of FIG. 7 is provided with a single, uncoated outer cover plate 92.

As can be appreciated, the type of coating on the cover plates and the type of absorber that may be used do not limit the invention. For example, in the above-mentioned application, Ser. No. 450702, filed even date, there is a disclosed a variety of cover plates and coatings on the cover plates that may be used with the solar heat collectors of the present invention. More particularly, the coating on one or both of the cover plates may be a tin oxide coating applied in a manner taught in U.S. Pat. Nos. 2,566,346; 3,107,177; and 3,677,814 or an indium oxide coating applied in a manner taught in U.S. Pat. Nos. 3,447,936; 3,506,557; and 3,655,545 which teachings are hereby incorporated by reference.

With reference to FIG. 2, the discussion will now be directed to the edge packing 32 for the solar heat collector 22. As previously mentioned, the edge packing preferably is of the type that (1) absorbs moisture from between the cover plates 28 and 30 and from between the cover plate 28 and absorber 26 which moisture is trapped therebetween during fabrication and (2) prevents moisture from moving between the cover plates 28 and 30 and from moving between the cover plate 28 and absorber 26 during the use of the solar heat collector. It has been found that when edge packing having the above characteristics is used in the construction of solar heat collectors, the efficiency of the heat collector is increased. The efficiency is increased because there will be no moisture to condense on the outer and intermediate cover plates and absorber when the solar heat collector cools. In the prior art, no provisions are made for preventing moisture from moving between the cover plates and absorber or for removing moisture trapped therebetween during fabrication. When the prior art solar heat collectors are cooled, the moisture between the cover plates and absorber condenses on the plates and absorber thereby decreasing (1) the transmittance and reflectance coefficients of the cover plates and (2) the absorptivity coefficient of the absorber. When this occurs, the time required for the solar heat collector to heat up increases. Removing and preventing moisture from moving between the cover plates and the absorber, the efficiency of the solar heat collector is increased because (1) there is no condensation which can obstruct the passing of solar radiation to the absorber; (2) there is no reduction in the amount of infrared energy and solar radiation reflected back to the absorber; and (3) there is no reduction in the amount of solar radiation and infrared energy absorbed by the absorber.

An example of a preferred type of edge packing will now be discussed. As will be appreciated by those skilled in the art, the invention is not limited thereto.

With reference to FIG. 2, the cover plates 28 and 30 and the absorber 26 are separated at their marginal edges by a metal spacer element 100 such as type disclosed in U.S. Pat. No. 2,684,266. The discussion will be directed to the edge packing between cover plates 28 and 30 with the understanding that the discussion is applicable to the edge packing between intermediate cover plate 28 and absorber 26 unless indicated otherwise. The spacer element 100 includes a tubular portion of generally rectangular cross section that is filled with a desiccant material 102, such as granular or powdered silica gel. Communication between the air space between cover plates 30 and 28 and the desiccant 102 is provided through a plurality of channels or passages 104 in spacer element 100. The spacer 100 extends completely around and between the marginal edges of the cover plates 28 and 30.

Opposed surfaces 106 and 108 of the spacer element 100 are adhered to marginal surfaces 110 and 112 of the cover plates 28 and 30 respectively, by a thin continuous film of a moisture-resistant adhesive 114.

The moisture-resistant adhesive 114 which may be used within the contemplation of this invention, but not limited thereto, are materials that are capable of flow at room temperature and include precured materials such as disclosed in U.S. Pat. No. 2,974,377, as well as room temperature-curable materials such as disclosed in U.S. Pat. No. 3,791,910 which description thereof is hereby incorporated by reference.

With reference to the spacer element 100 between the cover plate 28 and absorber 26, a portion of the spacer at 116 is removed to receive outlet end 42 and similarly a portion of the spacer (not shown) is removed to receive outlet end 42 of the conduit 36 which ends extend beyond the solar heat collector (see also FIG. 3).

With continued reference to FIG. 2, a resilient moisture-resistant strip 118 with a layer of mastic 120 adhered thereto, such as disclosed in U.S. Pat. No. 2,974,377, is bonded to the peripheral edge e.g., flat side 122 of the metal spacer element 100 and the peripheral edges of the absorber and cover plates 26, 28 and 30, respectively.

A channel member 124 of essentially U-shaped cross section also extends completely around the perimeter of the windows to protect its edges. The channel member 124 generally includes several sections of channeling that are joined or butted together at their ends.

As can now be appreciated, the invention is not limited to any particular edge packing but only to those edge packings that absorb moisture from between the cover plates and absorber and prevent moisture from moving between the cover plates and absorber.

Figure 9:
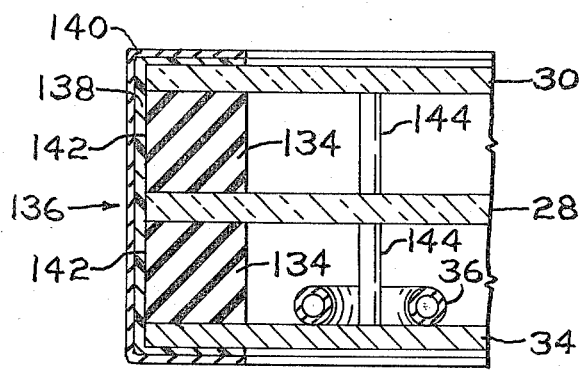
FIGS. 8 and 9 are fragmented cross-sectional views of alternate edge packing that may be used in the practice of the invention.
Figure 8:
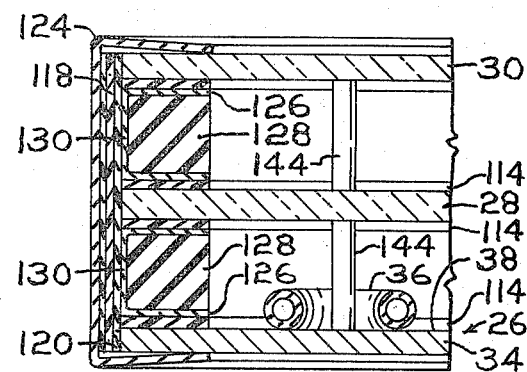

With reference to FIGS. 8 and 9, there are shown alternate embodiments of edge packing that may be used in the practice of the invention. With specific reference to FIG. 8, there is shown the cover plates 28 and 30 and absorber 26 separated at their marginal edges by a metal spacer channel 126. The metal spacer channel 126 includes tubular portions of a generally U-shaped cross-section having a dehydrator element 128 such as the type described in U.S. Pat. No. 3,758,996 which description is hereby incorporated by reference. To prevent the dehydrator element 128 from falling out of the metal spacer channel 126, it is recommended that the element be secured in the metal spacer channel 126 as by adhesive.

The metal spacer channel 126 is secured to the cover plates 28 and 30 and cover plate 28 and absorber 26 by the moisture resistant adhesive 114 in a similar manner as for solar heat collectors 22 of FIG. 2.

The moisture resistant strip 118 of FIG. 2 having the layer of adhesive 120 is adhesively bonded to (1) peripheral edges of the cover plates 24 and 26, absorber 22 and flat side 130 of the metal spacer channel 126. The channel member 124 as shown in FIG. 2 completely surrounds the collector.

Referring now to FIG. 9, there is shown still another embodiment of edge packing that may be used in the practice of the invention. In this instance, the cover plates 28 and 30, and absorber 26, are separated by a spacer dehydrator element 134 such as the type disclosed in the above-mentioned U.S. Pat. No. 3,758,996. A composite strip 136 having a moisture resistant adhesive 138 on a bendable-formable tape 140 is adhesively bonded to (1) flat side 142 of the spacer dehydrator element 134, the peripheral edges of the cover plates 28 and 30 and absorber 26 and (2) to the marginal edges of the cover plate 30 and absorber 26.

As can be appreciated, the composite strip 136 is interchangeable with the thin strip 118 having the layer of adhesive 120 and/or the channel member 124 (see FIG. 2.).

A vacuum can be provided between the cover plates and the absorber to reduce heat losses due to convection. In the instance where vacuum is to be employed between the plates and the absorber it is recommended that the metal spacer element 100 or the metal spacer channel 126 as shown in FIGS. 2 and 8, respectively, be used. This is because the atmospheric pressure urges the cover plates and absorber toward each other. By providing a rigid metal spacer, the sheets are maintained in spaced relation. Further, if the sheets are of a large dimension, for example, greater than about 2 feet by 2 feet, it is recommended that spacer blocks 144 (see FIGS. 1, 2 and 3) made of cork or plastic be selectively positioned between the cover plates 26 and 28 and between the absorber 26 and cover plate 28 to prevent the plates from contacting one another and the absorber. Further, as can be appreciated by those skilled in the art, the glass sheets may be prestressed, for example, provided with a radius so as to act against positive pressure of the atmosphere thereby eliminating the need for spacer blocks. Further, it is recommended that approximately the same amount of vacuum be provided between the cover plates 28 and 30 and between cover plate 28 and absorber 26. In this manner, the plate 28 will be maintained in spaced relationship to both the plate 30 and absorber 26. Still further, it is recommended that the glass sheets be tempered.

With reference to FIGS. 1 and 2, the solar heat collector 22 is preferably mounted in the insulated box 24 to reduce convection heat losses. The insulated box 24 includes a solid bottom 146 and sides 148. The top portion of the box as viewed in FIG. 1 is provided with a ledge 150 to maintain the collector in the box. The inlet and outlet ends 40 and 42, respectively, of the conduit 36 pass through sides of the box to provide external access to the conduit so as to move the heat-absorbing medium through the conduit. Insulating material 152 such as fiber glass or glass wool or urethane foam is provided between the solar heat collector and inside surfaces of the box to minimize convection heat losses of the heat collector.

As can be appreciated, using the solar heat collector of this invention eliminates the drawbacks of the prior art. More particularly, there is no condensation within the solar heat collector which can reduce the passing of solar energy to the absorber and reduces the energy absorbed by the absorber. Secondly, the solar heat collector can be made on a mass production basis thereby making it economical to construct.

DETAILED DESCRIPTION OF THE INVENTION

With reference to FIG. 10, solar heat collector units 20, 154, 156 and 158 of FIGS. 2, 5, 6 and 7, respectively, constructed in accordance with the teachings of this invention will be used to supplement heated water to a 54-gallon electric hot water tank 160 in a house 161. As can be appreciated, the use of the solar heat collectors to supplement heated water to an electric hot water tank is merely illustrative of how the solar heat collectors of this invention may be used and is not limited thereto.

Absorber 26 of each of the solar heat collectors 22, 70, 80 and 90 (FIGS. 2, 5, 6, and 7 respectively) is fabricated in the following manner. Twenty (20) sections of copper tubing about 6½ feet in length and having an outside diameter (O.D.) of ⅝ inch and ½ inch inside diameter (I.D.) are advantageously joined at their ends by copper return bends having 1-9/16 inch radius to provide a conduit. A section of copper tubing 7 feet in length is connected at each end of the conduit by 1-9/16 inch radius copper return bends to provide inlet and outlet ends 40 and 42 respectively, of the conduit 36 (see FIG. 3).

With reference to FIG. 3, the conduit 36 having a serpentine configuration is advantageously mounted on a copper plate 34 having dimensions of 3 feet × 7 feet and 1/16 inch thick as by soldering. The conduit is centered on the surface 38 of the plate with the inlet end and outlet end of the conduit extending about 5 inches from opposed sides of the plate.

The conduit 36 and plate 34 are coated with black paint such as the type sold by PPG Industries, Inc., under the trademark DURACRON Super 600 L/G and fired at a temperature of 350° for 15 to 20 minutes to provide the plate and conduit with a non-selective surface having an absorptivity coefficient for solar energy in the wavelength of 0.3 to 2.1 microns and an emissivity coefficient for infrared energy in the wavelength of 2 to 15 microns of about 0.95.

The discussion will now be directed to the construction of the solar heat collector 22 of FIG. 2.

Four sections of lock seam spacer element 100 having a desiccant 102 such as molecule sieve and/or silica gel are provided. The lock seam spacer elements are of the type disclosed in U.S. Pat. No. 2,684,266. The spacer elements have a height of about ½ inch, i.e., between surfaces 106 and 108 (see FIG. 2), and a width of about ⅜ inch. Two spacer elements are 7 feet in length and the other two are 3 feet in length. The ends of the spacer elements are mitered and joined together as by welding to provide a frame 7 feet x 3 feet and ½ inch high. The corners are ground to remove any high spots that may put the corners of the collector under stress.

A tube 162 having an I.D. of about ¼ inch and 1 inch in length is mounted through a wall of the frame of joint spacer elements as shown in FIG. 2 to pull a vacuum between cover plates 28 and 30. The tube is mounted in the frame as by welding to provide an air-impervious seal between the tube and the frame.

A second frame of section of lock seam spacer elements is constructed in a similar manner. The second frame of joined spacers will be positioned between the cover plate 26 and the absorber 22. In the construction of the solar collectors 22, the conduit 36 will be facing the intermediate cover plate, therefore, it is necessary to provide a pair of ¾ inch grooves 116 one on a side of the frame to receive the inlet and outlet ends 40 and 42, respectively, of the conduit 36.

A pair of commercial-soda-lime glass sheets having dimensions of 7 feet x 3 feet and ⅛ inch thick are provided. The glass sheets are cleaned in any conventional manner to remove any foreign particles that may inhibit the passing of solar radiation through the sheets toward the absorber 26.

The sheet of glass designated as the intermediate cover plate 28 is provided on each side with four spacer blocks 144 about ½ inch high and having a diameter of about 1 inch. The spacer blocks 144 are made of cork and adhesively bonded at one end to the intermediate cover plate 28 in any conventional manner. With reference to FIG. 3, spacer blocks on each side of the cover plate 28 are mounted 2 feet in from opposed sides 164 and about 7 to 8 inches in from opposed sides 166. The spacer blocks maintain the cover plates 28 and 30 and absorber 26 in spaced relation when a vacuum is provided between the plates and the absorber.

Referring back to FIG. 2, a layer of moisture-resistant adhesive 114 of the type disclosed in U.S. Pat. No. 3,791,910 having a thickness of about 15 to 20 mils and a width of less than about 5/16 inch is extruded onto opposed surfaces 106 and 108 of each of the frame of joint spacer elements 100.

The absorber 26 is positioned on a rigid surface with the surface of the conduit 36 facing upward. The second frame of joint spacer elements having the grooves 116 is positioned on the absorber with the inlet end and outlet ends 40 and 42 respectively, aligned with the grooves 116 formed in the spacer element.

The intermediate cover plate 28 is positioned on top of the second frame. Thereafter, the first frame is positioned on the intermediate cover plate 28 followed by the outer cover plate 30.

The adhesive 114 between the frames of joint spacer elements, cover plates 28 and 30, and absorber 26 is flowed in any conventional manner to form a moisture-resistant seal. Disclosed in U.S. patent application Ser. No. 400,112, filed on Sept. 24, 1973, in the name of George H. Bowser et al., and entitled "Method of Fabricating a Multiple Glazed Unit", there is disclosed a method and apparatus which may be used to flow the adhesive 114 to form the moisture-resistant seal between the spacers, cover plates and absorber which teachings thereof are hereby incorporated by reference.

After the moisture-resistant seal is formed, a vacuum is pulled between the cover plates and absorber by way of tube 162 in any conventional manner. The vacuum is about 4 to 5 inches of water. Thereafter, the tubes are sealed as by welding.

With reference to FIG. 2, a 1⅜ inch wide strip 118 having a layer of adhesive 120 on one surface such as disclosed in U.S. Pat. No. 2,974,377 is bonded to the peripheral edges of the absorber, cover plates and flat side 122 of the frame of joint spacer elements 100 to provide a second moisture-resistant barrier. The strip 118 and mastic 120 extends completely around the perimeter of the collector.

A channel member 124 of essentially U-shaped cross-section is also provided completely around the perimeter of the collector to protect the edges. The channel member 124 is provided with holes to receive the inlet and outlet ends 40 and 42 respectively, of the conduit 36 which extends beyond the channel member 124 (see FIG. 3). The channel member generally consists of several sections of channeling that are joined or butted together at the corners of the collector.

With reference to FIG. 1, sections of wood ½ inch thick are advantageously joined together at their ends to form a frame of insulating box 24 having dimensions of 7½ feet × 3½ feet and 4⅜ inches high. On opposed sides of the wooden frame, grooves 168 are provided for receiving the inlet and outlet ends 40 and 42 respectively, of the conduit 36. On the top side of the frame there is provided 4 inch wide strips of wood to form a ledge 150 to prevent the solar heat collector from falling out while exposing the heat collector to solar radiation. Solar heat collector is positioned in the frame and glass wool 152 is packed between the collector and the inside walls of the frame. Glass wool is also provided on the bottom surface of the solar collector and a section of wood is secured to the wooden frame to form the insulating box 24.

Solar heat collector unit 154 of FIG. 5 having solar heat collector 70 is constructed in a similar manner as solar heat collector 20 of FIG. 2 with the exception that the intermediate cover plate 74 has a coating 78 of indium oxide applied to surface 72 in the manner disclosed in the above-mentioned U.S. patents and having a thickness of 3,000 angstroms.

Solar heat collector unit 156 of FIG. 6 having solar heat collector 80 is constructed in a similar manner as the solar heat collector unit 20 of FIG. 2 except that surface 82 of the intermediate plate 84 and surface 86 of the outer cover plate 88 is provided with a coating of indium oxide having a thickness of 3,000 angstroms.

The solar heat collector unit 158 of FIG. 7 having solar heat collector 90 is constructed in a similar manner as the solar heat collector 30 of FIG. 2 with the exception that only one clear plate 92 is used and mounted in spaced relationship to the absorber 26.

With reference to FIG. 10, the inlet end 40 of each unit is connected to an end of a copper tubing 172 having a ½ inch I.D. The tubing 172 is connected at the other end to a heating coil 174 and a 10 gallon capacity heat exchanger 176. The heat exchanger is of the type sold by Bell and Gossett and identified as indirect water heater size 500 double coil.

The outlet end 42 of each unit is connected to an end of a copper tubing 178 having a ½ inch I.D. The other end of the tubing 178 is connected to the other end of the heating coil 174 to complete a heating loop 180. Circulating pump 182 having a capacity of 1.2 gallons per minute is mounted in the copper tubing 178 to recirculate a mixture of 15 percent ethylene glycol and 85 percent water through the heating loop 180. An expansion tank 184 is mounted in the tubing 172 to relieve any pressures that may build up as the recirculating heating medium is heated.

Mounted in the tubing 178 is a thermocouple probe 186 connected by wire 188 to a control box 190. At a preselected temperature, for example 100°F., the control box energizes the pump 182 by way of wire 192 to move the heating medium through the heating loop 180. By providing the control box to operate the pump at a preselected temperature, the pump is only operative when the solar heat collector units are being heated by solar radiation and infrared energy.

Water is supplied to the heat exchanger 176 by a main water line 194.

Inlet end 196 of the heat exchanger 176 is connected to outlet end 198 of a conventional 80-gallon capacity storage tank 200 by way of ½ I.D. copper tubing 202. The outlet end 204 of the heat exchanger 176 is connected to inlet end 206 of the water storage tank 200 by way of tubing 208 having an I.D. of ½ inch. Mounted in the tubing 202 is a circulating pump 210 having a capacity of 2.4 gallons per minute to recirculate water through the heat exchanger 176 and the storage tank 200. The pump 210 is connected by wire 212 to the control box 190 so as to energize the pump 210 when the heat-absorbing medium is heated to the preselected temperature, e.g., 100°F., and is moved through the heating loop by pump 182.

A second outlet end 214 of the heat storage tank 200 is connected to an inlet end 216 of the hot water tank 160 by way of tubing 218. Outlet end 220 of the hot water tank 160 is advantageously connected to hot water line 222. All tubing are preferably covered with ⅝ inch rubber insulation to reduce heat losses due to convection.

The above-described system was arranged in Melbourne, Florida. On a given day, the solar heat was measured at 280 BTU's per square foot per hr. At sunrise, the temperature of the water in the storage tank 200 was about 72°F. Water in the hot water tank was maintained at 145°F. by electric heater 224.

The temperature of the heating medium as measured by thermocouple probe 186 was 72°F. and the circulating pumps 182 and 210 were set to be energized by the control box 190 when the temperature of the heating medium reached 100°F., as measured by the thermocouple probe 186.

Within about 1½ hours after sunrise, the temperature of the heating medium was 100°F. The pumps 182 and 210 were energized. The pump 182 recirculated the heating medium through the heating loop 180 at a rate of 1.2 gallons per minute and the pump 210 circulated water from the heat exchanger 174 to the storage tank 200 at a rate of 2.4 gallons per minute.

About 4½ hours after sunrise, the temperature of the heating medium reached 180°F. The temperature of the units 20, 154, 156 and 158 was 240°F., 220°F., 108°F., and 140°F., respectively. The temperature of the water in the storage tank 200 was 155°F.

Solar heat collector units of this invention increased the temperature of 80 gallons of water from 72°F., to 155°F. in 4½ hours. The time would have increased if the solar heat collectors were constructed according to the prior art teachings. More particularly, because the space between the cover plate and absorber were free of moisture, there was no condensation present, which would have reduced the amount of solar radiation incident on the absorber and reduced the amount of reflected solar radiation and infrared energy reflected from the intermediate and outer cover plate toward the absorber.

What is claimed is:

1. A solar heat collector, comprising:
   at least one cover plate capable of passing solar energy having a major surface with a predetermined transmittance coefficient greater than zero, said at least one cover plate having predetermined peripheral dimensions and shape;
   a solar energy absorber having peripheral dimensions and shape similar to said at least one cover plate, said absorber having conduit means for moving a heat absorbing medium therethrough and a major surface having a predetermined absorptivity greater than zero;
   a rigid spacer frame having peripheral dimensions and shape similar to said at least one cover plate, said spacer frame mounting marginal edge portions of the major surfaces of said at least one cover plate and said absorber to provide a compartment therebetween;
   desiccating means mounted in said spacer frame and communicating with the compartment to remove moisture in the compartment;
   a continuous layer of moisture-impervious adhesive mounting said at least one cover plate, absorber and spacer frame to prevent moisture from moving into the compartment; and
   said layer of moisture-impervious adhesive and desiccating means maintaining the compartment essentially free of moisture to prevent the decrease of the predetermined absorptivity coefficient of said absorber and predetermined transmittance coefficient of said at least one cover plate.

2. The solar heat collector as set forth in claim 1 wherein said at least one cover plate is a first glass sheet, said spacer frame is a first metal spacer frame, and further including:
   a second glass sheet having peripheral dimensions and shape similar to said first glass sheet;
   a second metal spacer having peripheral dimensions and shape similar to said first glass sheet mounted to the marginal edge portions of said first and second glass sheets by a continuous layer of moisture-impervious adhesive to provide a compartment therebetween;
   desiccating facilities mounted in said second metal spacer and communicating with the compartment to remove moisture in the compartment;
   a continuous layer of moisture-impervious adhesive between said first metal spacer and marginal edge portion of the major surface of said absorber and said first glass sheet;
   a moisture-impervious tape having a continuous layer of moisture-impervious adhesive mounted on the peripheral edge portion of said glass sheets, said spacer frames and said absorber and extending over the outer marginal edge portions of said second glass sheet and said absorber; and
   a U-shaped channel member mounted on the marginal edges of said first glass sheet and said absorber.

3. The solar heat collector as set forth in claim 1 wherein said spacer frame is made of metal tubing.

4. The solar heat collector as set forth in claim 1 wherein said layer of moisture-impervious adhesive is provided around the peripheral edge portions of said spacer frame, said absorber and said at least one cover plate and further including:
   a moisture-impervious tape mounting said adhesive layer.

5. The solar heat collector as set forth in claim 1 further including:
   a U-shaped channel member mounted on the marginal edges of said at least one cover plate and said absorber to urge said at least one cover plate and said absorber toward each other.

6. The solar heat collector as set forth in claim 1 wherein said at least one cover plate is glass.

7. The solar heat collector as set forth in claim 6 wherein said glass is tempered glass.

8. The solar heat collector as set forth in claim 1 wherein said at least one cover plate has a coating to increase the reflectance coefficient of said at least one cover plate to infrared energy.

9. The solar heat collector as set forth in claim 2 wherein said absorber comprises a copper plate and said conduit means comprises copper tubing each having a coating to increase the absorptivity coefficient of said copper plate and copper tubing.

* * * * *